(12) United States Patent
Shih et al.

(10) Patent No.: US 9,094,583 B2
(45) Date of Patent: Jul. 28, 2015

(54) ADAPTIVE AROUND-VIEW MONITORING DEVICE

(75) Inventors: Yu Ting Shih, New Taipei (TW); Cheng Nan Ho, New Taipei (TW); Szu Hong Wang, New Taipei (TW); Wu Jhih Sie, New Taipei (TW)

(73) Assignee: ACARD TECHNOLOGY CORP., New Taipei (TW)

( * ) Notice: Subject to any disclaimer, the term of this patent is extended or adjusted under 35 U.S.C. 154(b) by 425 days.

(21) Appl. No.: 13/589,258

(22) Filed: Aug. 20, 2012

(65) Prior Publication Data
US 2013/0329005 A1    Dec. 12, 2013

(30) Foreign Application Priority Data

Jun. 7, 2012   (TW) .............................. 101211050 U

(51) Int. Cl.
*H04N 7/00* (2011.01)
*H04N 7/18* (2006.01)
*B60R 1/00* (2006.01)

(52) U.S. Cl.
CPC *H04N 7/183* (2013.01); *B60R 1/00* (2013.01); *B60R 2300/102* (2013.01); *B60R 2300/105* (2013.01); *B60R 2300/402* (2013.01)

(58) Field of Classification Search
CPC .............. B60R 2300/802; B60R 11/04; B60R 2300/607
USPC ............ 348/36, 118, 148, 115, 117, 123, 124
See application file for complete search history.

(56) References Cited

U.S. PATENT DOCUMENTS

2012/0262578 A1 * 10/2012   Weng et al. ................... 348/148

* cited by examiner

*Primary Examiner* — Jefferey Harold
*Assistant Examiner* — Omer Khalid
(74) *Attorney, Agent, or Firm* — Rabin & Berdo, P.C.

(57) ABSTRACT

An adaptive around-view monitoring device comprises a plurality of wide-angle cameras, a top-view image integration unit, a real-time image encoding/decoding unit, and an adaptive display processing unit, wherein the top-view image integration unit is further configured with a tuning/calibrating circuit which provides an acquisition and a calibration of erroneous parameters generated during the process of installation, and also substantially and efficiently reduces the routine time and procedure which repeats again and again to minimize or eliminate those parameters while the around-view monitoring device is being installed onboard the same type of vehicles. Furthermore, the adaptive display processing unit is able to adjust and output the optimized size and ratio of image to fit the display device installed on the vehicle. And, the present invention is able to provide the driver a real-time and correct around-view image and information.

5 Claims, 2 Drawing Sheets

ADAPTIVE AROUND-VIEW MONITORING DEVICE

BACKGROUND OF THE INVENTION

1. Field of the Invention

The present invention is primarily related to an adaptive around-view monitoring device, and more particularly to a configurative design that comprises a tuning/calibrating circuit, configured in the top-view image integration unit, which enables the present invention to acquire and calibrate those erroneous parameters generated during the process of installation, and substantially reduce the routine time and procedure which repeats again and again to minimize or eliminate those parameters while the around-view monitoring device is being installed on board the same type of vehicles. Besides, the routine image tuning and/or calibrating is also carried is out after the adaptive around-view monitoring device had been installed. Therefore, the present invention is applicable in all kinds of vehicles which are equipped with an around-view monitoring device.

2. Description of Related Art

Due to the speedy progress of technology, vehicles are quite often installed with a back sensor or display unit to show the back side during driving or parking for providing the driver a better visual assistance and judgment to protect the car from any undesired damage or collision.

Nowadays, advanced vehicles are also provided with an Around-View Monitor (AVM), wherein the wide-angle cameras are established at different locations to collect full view images of 360-degree around the vehicle and to help or hint the driver to identify any potential obstacle.

However, every existing AVM needs to take several hours or longer to tune or calibrate the output display image or components' three-dimensional attitude due to some erroneous parameters arising from optical or vehicle's structural inherent reason to make sure the real-time display image is correct and can real-time fit the specification of display device. If the time consuming procedure repeats again and again, the process of AVM installation needs to be solved and improved with a more efficient and useful method and concept.

Thus, in view of the above problems, the present invention aims to provide an adaptive around-view monitoring device, which is capable of tuning and/or calibrating those erroneous parameters related to the installation of AVM. Those erroneous parameters will be built as a reference model for certain type of vehicle. It will substantially enhance the efficiency of AVM installation without long time consuming and redundant procedure.

SUMMARY OF THE INVENTION

The primary objective of the present invention is to provide an adaptive around-view monitoring device, which comprises a configuration of a plurality of wide-angle cameras, a top-view image integrating unit, a real-time image encoding/decoding unit, and an adaptive display processing unit, wherein the top-view image integration unit is further configured with a tuning/calibrating circuit which provides an acquisition and a calibration of erroneous parameters generated during the process of installation, and also substantially and efficiently reduces the routine time and procedure which repeats again and again to minimize or eliminate those parameters while the around-view monitoring device is being installed onboard the same type of vehicles.

Another objective of the present invention is to provide an adaptive around-view monitoring device, wherein the tuned/calibrated top-view image is sent to the adaptive display processing unit via the tuning/calibrating circuit and then the tuned/calibrated top-view image can follow the specification of the original display device equipped on board the vehicle to adjust and output the adaptive image size and display ratio, which facilitates the adaptive display processing unit with a function to process image with different screen ratio or symmetry, and especially a display device with angle error.

A further objective of the present invention is to provide an adaptive around-view monitoring device, wherein the original images from the real-time image encoding/decoding unit can be transferred to the adaptive display processing unit via the connection between each other, and then the adaptive display processing unit sends both original images from the real-time image encoding/decoding unit and those images from the top-view image integrating unit to the display device simultaneously, which enables the drivers to utilize function of the real-time and correct around-view image information.

One more objective of the present invention is to provide an adaptive around-view monitoring device, wherein the tuning/calibrating circuit enables a routine or provisional image adjustment and/or calibration via the tuning/calibrating circuit, and ensures the present invention provides the driver with a safety and correct around-view information.

The present invention relates to an adaptive around-view monitoring device, which primarily comprises a configuration of a plurality of wide-angle cameras, a top-view image integrating unit, a real-time image encoding/decoding unit and an adaptive display processing unit, wherein the plurality of wide-angle cameras are separately installed around the vehicle to shot those original raw images, and connect with the real-time image encoding/decoding unit to receive said original images. The present invention is characterized that the top-view image integrating unit is further configured with a raw image acquisition unit, a top-view image corresponding unit and a tuning/calibrating circuit, wherein the raw images are shot and transmitted to the top-view image corresponding unit via the acquisition and temporary storing at the raw image acquisition unit, and then are shifted into top-view images which are processed by the tuning/calibrating circuit to carry out acquisition and calibration of each erroneous parameters. Finally, the rectified images are transferred to the adaptive display processing unit to have those images fit each different display device which is installed on board varieties of vehicles, and to provide the real-time, safe and correct around-view image information.

BRIEF DESCRIPTION OF THE DRAWINGS

To enable a further understanding of the said objectives and the technological methods of the invention herein, the brief description of the drawings below is followed by the detailed description of the preferred embodiments.

10、 wide-angle camera
101、 raw image shot from the front plate
102、 raw image shot from the rear plate
103、 raw image shot from the lower side of the left back minor
104、 raw image shot from the lower side of the right back mirror
20、 top-view image integrating unit 21、raw image acquisition unit
22、top-view image corresponding unit
23、tuning/calibrating circuit
24、top-view image
30、real-time image encoding/decoding unit
31、memory
32、transmission port
33、storing device
40、adaptive display processing unit
50、display device

DETAILED DESCRIPTION OF THE PREFERRED EMBODIMENTS

Figure 1:
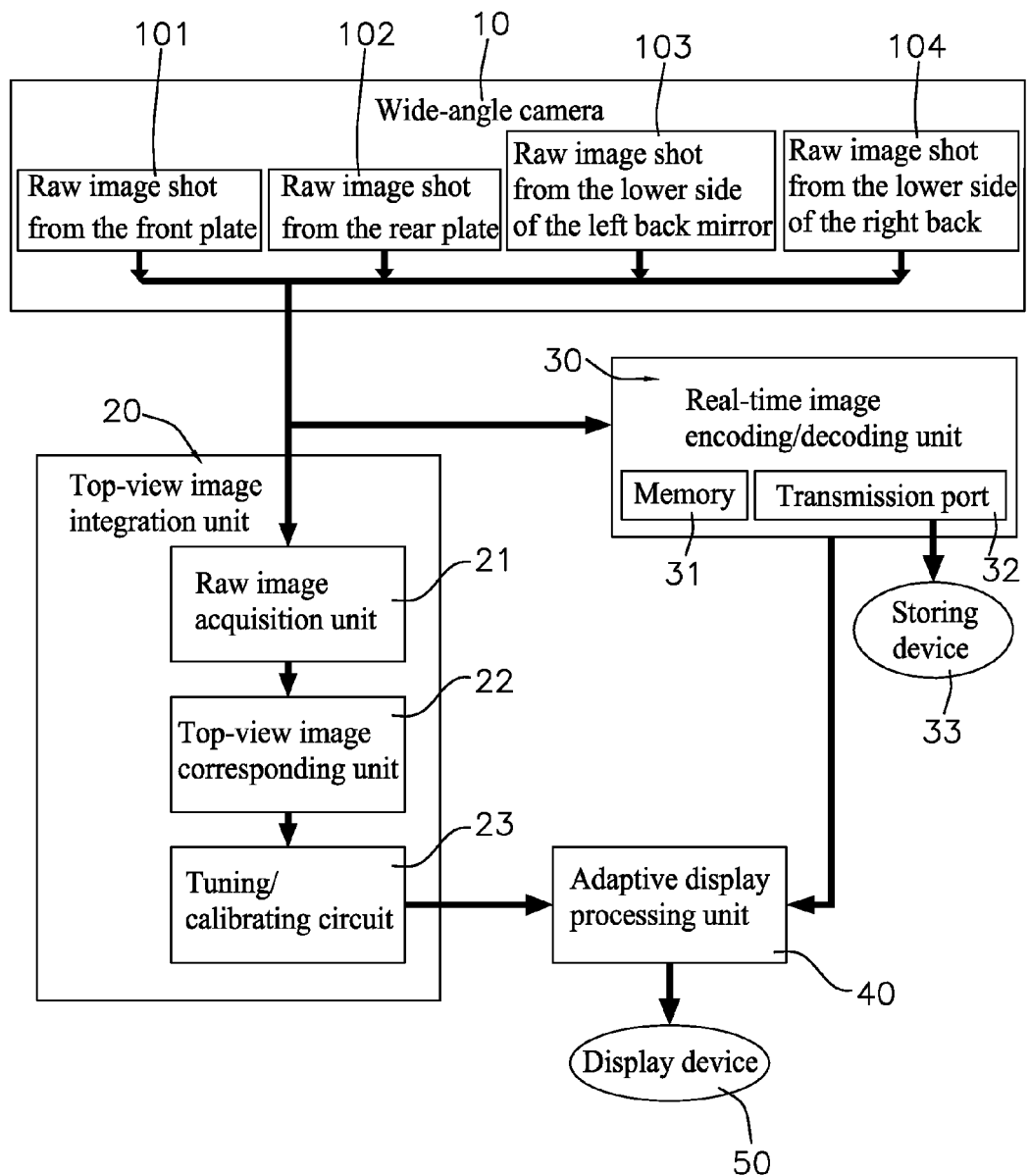
FIG. 1 is a schematic block diagram of an embodiment according to the present invention.
Figure 2:
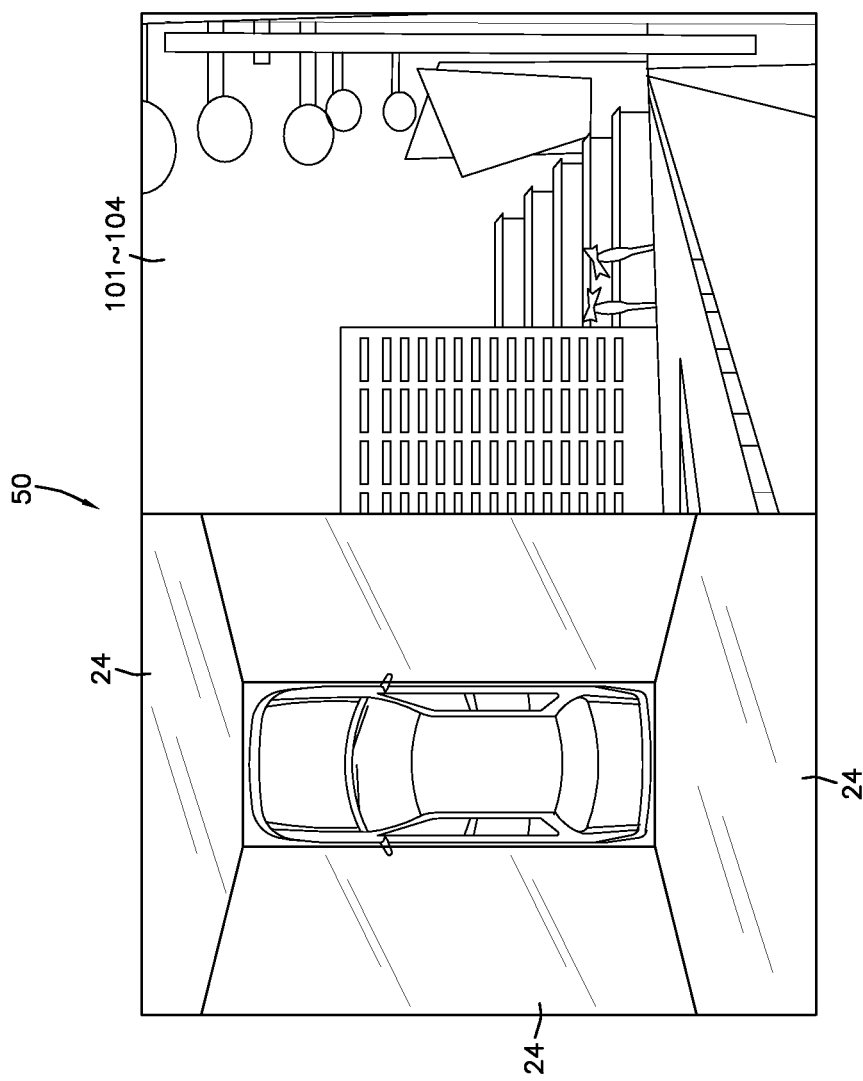
FIG. 2 is a schematic view shown by the display device to demonstrate an embodiment of the present invention.

Please refer to FIGS. 1 and 2, which respectively show a schematic block diagram of an embodiment and a schematic view shown by the display device to demonstrate an embodiment of the present invention. The present invention provides an adaptive around-view monitoring device, which primarily comprises a configuration of a plurality of wide-angle cameras 10, a top-view image integrating unit 20, a real-time image encoding/decoding unit 30, and an adaptive display processing unit 40, wherein a pluralities of wide-angle cameras 10 are respectively mounted on locations around the structure of the vehicle to shoot the around-view raw images 101、102、103、104, and connect with the real-time image encoding/decoding unit 30 to receive said original raw images 101、102、103、104. The present invention is characterized that the top-view image integrating unit 20, electrically connected with the plurality of wide-angle cameras 10, is further configured with a raw image acquisition unit 21, a top-view image corresponding unit 22 and a tuning/calibrating circuit 23, wherein the raw images 101、102、103、104 are shot and transmitted to the top-view image corresponding unit 22 via the acquisition and temporary storing at the raw image acquisition unit 21, and then are shifted into top-view images 24 which are processed by the tuning/calibrating circuit 23 to carry out acquisition and calibration of erroneous parameters routinely or provisionally. Finally, the rectified images are transferred to the adaptive display processing unit 40 to have those images trimmed and fit each different display device 50 which is installed on board varieties of vehicles, and to provide the real-time, safe and correct around-view image information.

Meanwhile, the real-time image encoding/decoding unit 30 accepts the original raw images 101、102、103、104 from a pluralities of wide-angle cameras 10 and is further linked with the he adaptive display processing unit 40, which enables the output of those raw images 101、102、103、104 are trimmed and adjusted to fit the size and screen ratio of the display device 50. The display device 50 is then shows real-time, calibrated and correct raw images 101、102、103、104 together with those top-view images 24 for drivers reference. And, the real-time image encoding/decoding unit 30 is further configured with a memory 31 which is chosen from a hard disk or a memory card to store those raw images 101、102、103、104. Besides, the real-time image encoding/decoding unit 30 is further equipped with a transmission port 32 which is an interface of USB, IEEE-1394, IDE or SCSI to output those raw images 101、102、103、104 as an evidence for further investigation and analysis. The raw image acquisition unit 21 primarily consists of RAM to temporarily store the original raw images 101、102、103、104, and the RAM could be an alternative of DRAM or SRAM. The display device 50 is an around-view monitor.

The present invention is an adaptive around-view monitoring device and primarily comprises a configuration of a plurality of wide-angle cameras 10, a top-view image integrating unit 20, a real-time image encoding/decoding unit 30, and an adaptive display processing unit 40, wherein the pluralities of wide-angle cameras 10 are separately installed around the vehicle to shot those original raw images 101、102、103、104 which each side covers around 180~190 degrees of angular range and forms around-view raw images 101、102、103、104. And, the top-view image integrating unit 20, electrically connected with the plurality of wide-angle cameras 10, is further configured with a raw image acquisition unit 21, a top-view image corresponding unit 22 and a tuning/calibrating circuit 23, wherein the tuning/calibrating circuit 23 acquires and calibrates those erroneous parameters generated during the process of installation, and substantially reduces the routine time and procedure which repeats again and again to minimize or eliminate those parameters while the around-view monitoring device is being installed on board the same type of vehicles.

Furthermore, the tuning/calibrating circuit 23 is capable to carry out a routine or provisional image adjustment and/or calibration due to those erroneous parameters generated by vehicle structural vibration or other factors, and ensures the present invention provides the driver with a safety and correct around-view information.

It needs to be noted that the top-view images 24 after tuning/calibrating and the original raw images 101、102、103、104 from the real-time image encoding/decoding unit 30 are sent to the adaptive display processing unit 40 simultaneously and then are shown at different part of the display device 50 (as shown in FIG. 2). One of the original raw images 101、102、103、104 is displayed according to the driving status of vehicle automatically. Normally, it shows the raw image 101 while the vehicle is running ahead. And, it shows the raw image 102、103、104 while the vehicle is running astern, turning left or turning right.

Therefore, the present invention can provide a real-time, safe and correct around-view image information. It is, of course, to be understood that the embodiments described herein is merely an illustrative of the principles and structural relation of the invention and that a wide variety of modifications thereto may be accomplished by persons skilled in the art without departing from the spirit and scope of the invention as set forth in the following claims.

What is claimed is:

1. An adaptive around-view monitoring device, comprising:
   a plurality of wide-angle cameras, which are respectively mounted on locations around a vehicle to shoot around-view raw images from different directions;
   a real-time image encoding/decoding unit, which is connected to the plurality of wide-angle cameras to receive said around-view raw images and then outputs around-view raw images for further processing, the original raw images displayed automatically according to a driving status of a driver;
   a top-view image integrating unit, which is connected to the plurality of wide-angle cameras and includes a raw image acquisition unit, a top-view image corresponding unit and a tuning/calibrating circuit arranged therein, wherein the around-view raw images shot by the plurality of wide-angle cameras are transmitted to the top-view image corresponding unit via acquisition and temporary storage at the raw image acquisition unit, and then are shifted into top-view images, and the tuning/calibrating circuit acquires and calibrates erroneous parameters generated during installation and minimizes or eliminates those parameters; and an adaptive display processing unit, which is connected to the tuning/calibrating circuit of the top-view image integrating unit so that the adaptive display processing unit is operable, according to the parameters of the tuning/calibrating circuit, to adjust size and ratio of the images in an adaptive manner so as to make an output image fit to specifications of display screens of various models of vehicles and to supply instantaneous and correct images to drivers.

2. An adaptive around-view monitoring device according to claim 1, wherein the adaptive display processing unit is further connected to a display device and the display device is an around-view monitor.

3. An adaptive around-view monitoring device according to claim 1, wherein the real-time image encoding/decoding unit is further connected with a memory which is chosen from a hard disk or a memory card.

4. An adaptive around-view monitoring device according to claim 1, wherein the real-time image encoding/decoding unit is further equipped with a transmission port which is an interface of USB, IEEE-1394, IDE or SCSI to output those raw images.

5. An adaptive around-view monitoring device according to claim 1, wherein the raw image acquisition unit primarily consists of RAM which is one of DRAM and SRAM to temporarily store the original raw images.

\* \* \* \* \*